United States Patent [19]
Carlin et al.

[11] Patent Number: 5,498,028
[45] Date of Patent: Mar. 12, 1996

[54] METHOD AND APPARATUS FOR CONTROLLING AN ACTUATABLE RESTRAINING DEVICE

[75] Inventors: Mark Carlin, Hermosa Beach; James G. McCuskey, Lakewood, both of Calif.; Koichi Sugiyama, Nagoya, Japan

[73] Assignees: TRW Inc., Lyndhurst, Ohio; Toyota Jidosha Kabushiki Kaisha, Toyota, Japan

[21] Appl. No.: 177,232

[22] Filed: Jan. 4, 1994

[51] Int. Cl.⁶ .................................. B60R 21/32
[52] U.S. Cl. ................................................ 280/735
[58] Field of Search ............... 280/735; 364/424.05; 307/10.1

[56] References Cited

U.S. PATENT DOCUMENTS

| | | | |
|---|---|---|---|
| 4,975,850 | 12/1990 | Diller | 364/424.05 |
| 5,040,118 | 8/1991 | Diller | 364/424.05 |
| 5,067,745 | 11/1991 | Yoshikawa | 280/735 |
| 5,216,607 | 6/1993 | Diller et al. | 364/424.05 |
| 5,363,302 | 11/1994 | Allen et al. | 280/735 |

FOREIGN PATENT DOCUMENTS

| | | | |
|---|---|---|---|
| 0517253 | 6/1992 | European Pat. Off. | |
| 590476 | 4/1994 | European Pat. Off. | 280/735 |
| 4218483 | 12/1992 | Germany | |
| 59-8574 | 2/1984 | Japan | |
| 4-176746 | 6/1992 | Japan | 280/735 |

Primary Examiner—Karin L. Tyson
Attorney, Agent, or Firm—Tarolli, Sundheim & Covell

[57] ABSTRACT

An apparatus (30) for controlling an actuatable restraining device includes an accelerometer (60) for providing an electrical deceleration signal having a characteristic indicative of vehicle deceleration. An electronic controller (64) is connected to the accelerometer (60) and determines an average crash acceleration (AWIN) value in response to deceleration during a vehicle crash condition. The controller (64) determines a crash velocity value and a variably weighted velocity value (JMM2) equal to crash velocity times a variable weighting factor. The controller (64) provides an actuation signal to actuate the actuatable restraining device (i) when the average velocity value (AWIN) is greater than a first threshold value (WTHRESH) or (ii) when the variably weighted velocity value (JMM2) is greater than a second threshold value (JTHRESH) and the crash velocity is greater than a third threshold value (VTHRESH).

42 Claims, 4 Drawing Sheets

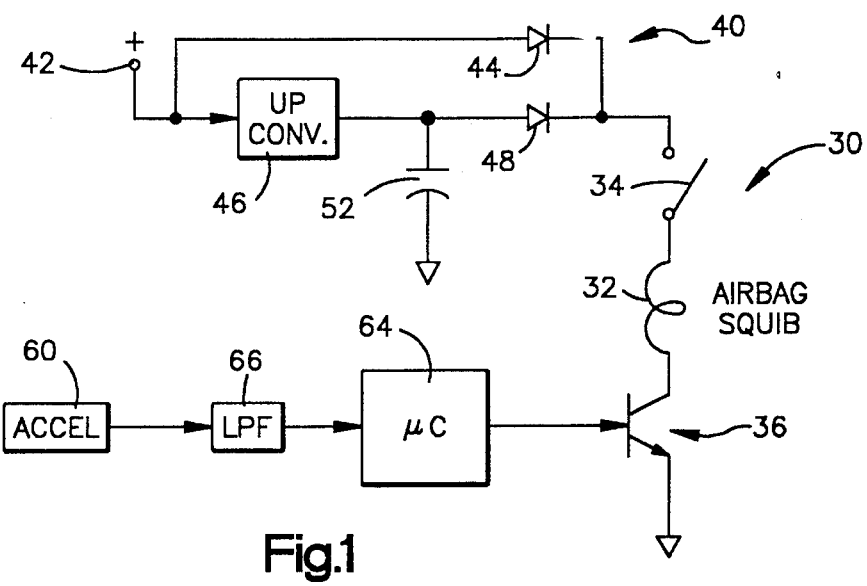
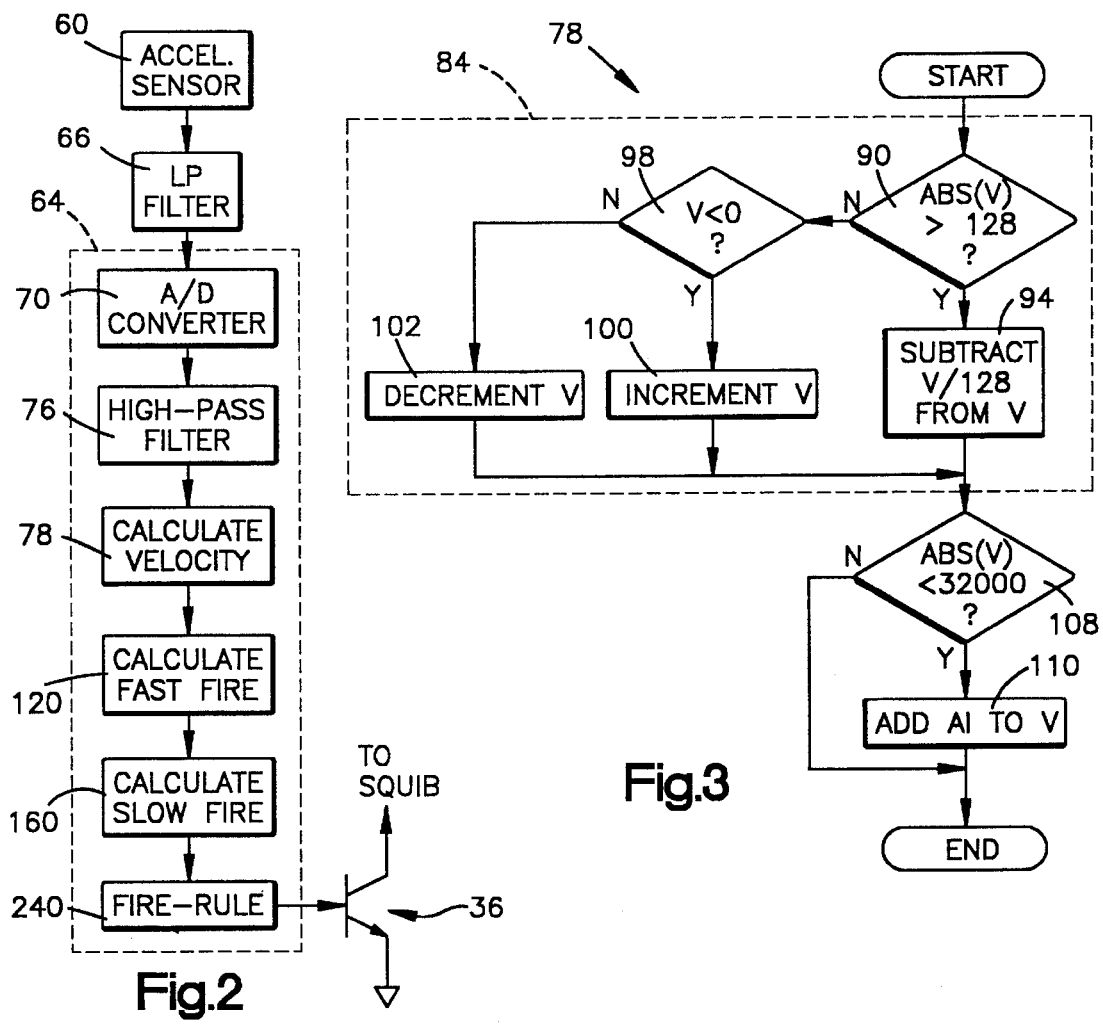
Fig.1
Fig.2
Fig.3

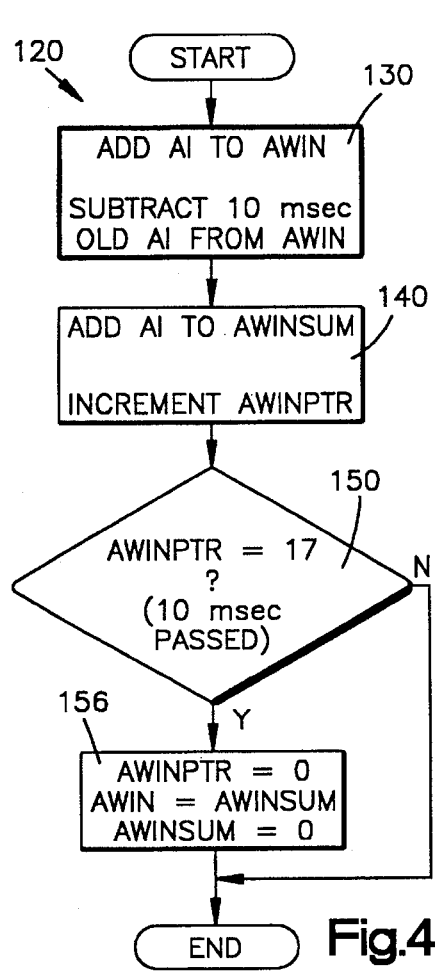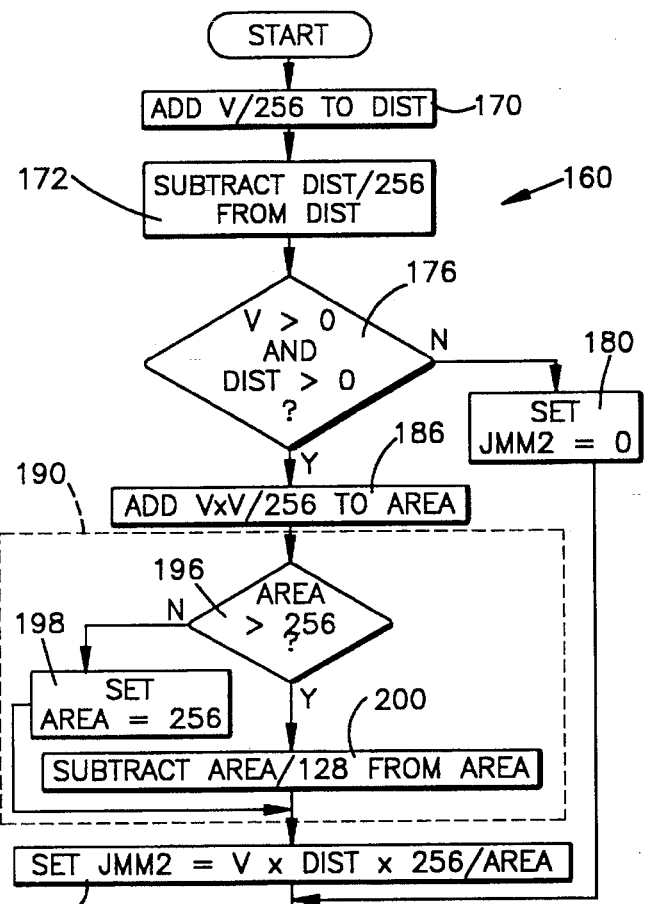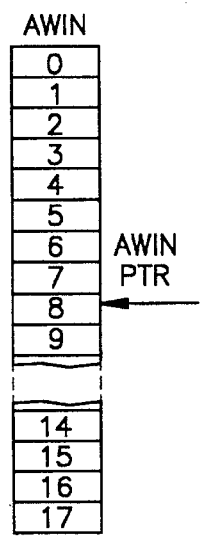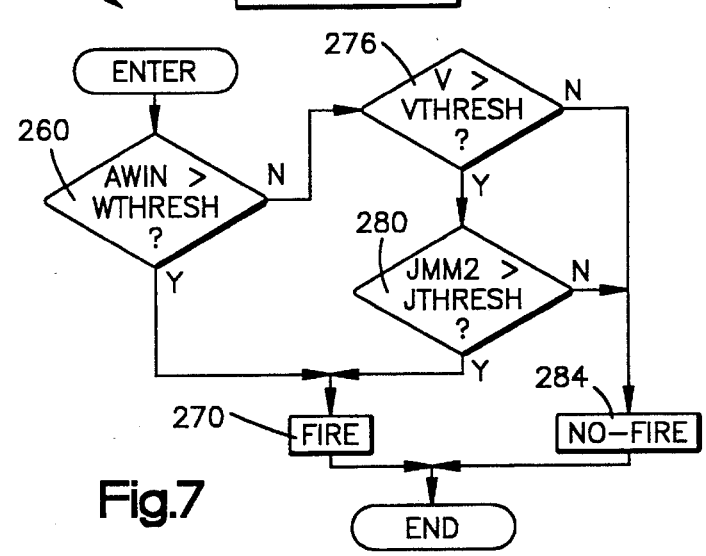

METHOD AND APPARATUS FOR CONTROLLING AN ACTUATABLE RESTRAINING DEVICE

TECHNICAL FIELD

The present invention is directed to a vehicle actuatable occupant restraint system and is particularly directed to a method and apparatus for controlling actuation of an occupant restraining device.

BACKGROUND OF THE INVENTION

Actuatable occupant restraint systems for vehicles are known in the art. One particular type of actuatable occupant restraint system includes an inflatable air bag mounted within the occupant compartment of the vehicle. The air bag has an associated, electrically actuatable ignitor, referred to as a squib. The system further includes one or more crash sensors for sensing the occurrence of a vehicle crash condition. Known arrangements include a series connected mechanical inertia switch, squib, and an electric switch, such as a transistor, connected across a source of electrical energy. An accelerometer is connected to a controller which is, in turn, connected to the electric switch. The controller monitors the accelerometer and, in response thereto, determines if a crash event is occurring. When a crash event occurs requiring deployment of the air bag, the inertia switch closes and the electric switch is closed by the controller resulting in an electric current of sufficient magnitude and duration to be passed through the squib to ignite the squib. The squib, when ignited, ignites a combustible gas generating composition and/or pierces a container of pressurized gas which inflates the air bag.

An inertia switch crash sensor is typically mounted to the vehicle frame and includes a pair of mechanically actuatable switch contacts and a resiliently biased weight. The biased weight is arranged such that when the vehicle decelerates, the weight physically moves relative to its mounting. The greater the amount and duration of the deceleration, the further the weight moves against the bias. The switch contacts are mounted relative to the biased weight such that, when the weight moves a predetermined distance, the weight moves over or against the switch contacts causing them to close. The switch contacts, when closed, connect a squib to one terminal of a source of electrical energy.

An electronic crash sensor for use in an actuatable occupant restraint system includes an electrical transducer or accelerometer for sensing vehicle deceleration. The accelerometer provides an electrical signal having a characteristic indicative of the vehicle's deceleration. A controller, such as a microcomputer, monitors the accelerometer output, evaluates the accelerometer signal, and controls actuation of the restraining device in response thereto.

One known controller evaluation process includes integrating the accelerometer output signal. The integral of the accelerometer output signal is indicative of the vehicle crash velocity. If the output of the integrator exceeds a predetermined velocity threshold value, an electrically controlled switch is closed which connects the squib to one terminal of an electrical energy source.

SUMMARY OF THE INVENTION

The present invention provides a method and apparatus for controlling actuation of an occupant restraint system in response to either an average acceleration value or a variably weighted velocity value as a result of the crash condition.

In accordance with one embodiment of the present invention, an apparatus is provided for controlling an actuatable restraining device. The apparatus comprises means for providing an electrical deceleration signal having a characteristic indicative of crash deceleration of the vehicle. Determining means determines a variably weighted crash velocity value from the deceleration signal. The apparatus further includes control means for permitting actuation of the actuatable restraining means when the determined variably weighted crash velocity value is greater than a first threshold value.

In accordance with another embodiment of the present invention, an apparatus is provided for controlling an actuatable restraining device. The apparatus comprises means for providing an electrical deceleration signal having a characteristic indicative of crash deceleration of the vehicle. Determining means determines from the deceleration signal a change in vehicle crash velocity value to crash distance. The apparatus further includes control means for permitting actuation of the actuatable restraining means when the determined value is greater than a first threshold value.

In accordance with still another embodiment of the present invention, an apparatus is provided for controlling an actuatable restraining device. The apparatus comprises means for providing an electrical deceleration signal having a characteristic indicative of crash deceleration of the vehicle. Average acceleration determining means monitors the deceleration signal at a plurality of discrete times and determines an average deceleration value in response to the monitored deceleration signal. The apparatus further includes control means for permitting actuation of the actuatable restraining means when the determined value is greater than a first threshold value.

In accordance with yet another embodiment of the present invention, an apparatus is provided for controlling an actuatable restraining device. The apparatus includes means for providing an electrical deceleration signal having a characteristic indicative of vehicle deceleration. Average acceleration determining means is provided for determining a first value functionally related to an average acceleration value in response to the electrical deceleration signal output from the accelerometer. Velocity value determining means determines a second value functionally related to vehicle crash velocity. Variable weighted velocity value determining means is provided for determining a third value functionally related to a crash velocity value times a variable weighting factor. Actuation control means provides an actuation signal to permit actuation of said actuatable restraining device (i) when the first value is greater than a first threshold value or (ii) when the second value is greater than a second threshold value and the third value is greater than a third threshold value.

In accordance with another embodiment of the present invention, a method is provided for controlling an actuatable restraining device. The method comprises the steps of determining crash deceleration of the vehicle and determining a variably weighted crash velocity value from the determined crash deceleration. The method further includes the step of permitting actuation of the actuatable restraining means when the determined variably weighted crash velocity value is greater than a predetermined threshold value.

In accordance with another embodiment of the present invention, a method is provided for controlling an actuatable restraining device. The method comprises the steps of determining crash deceleration of the vehicle and determining a change in crash velocity to crash distance in response to the determined crash deceleration. The method further includes the step of permitting actuation of the actuatable restraining means when the determined change in crash velocity to crash distance is greater than a predetermined threshold value.

In accordance with still another embodiment of the present invention, a method is provided for controlling an actuatable restraining device. The method comprises the steps of providing an electrical signal having a characteristic indicative of vehicle crash deceleration and monitoring the signal at a plurality of discrete times during a crash event. The method further comprises the steps of determining an average crash deceleration value from the discrete time monitorings of the signal and permitting actuation of the actuatable restraining means when the determined average crash deceleration value is greater than a predetermined threshold value.

In accordance with still yet another aspect of the present invention, a method is provided for controlling an actuatable restraining device including the steps of determining vehicle deceleration, determining an average crash deceleration value in response to the determined deceleration, determining a crash velocity value in response to the determined vehicle deceleration, and determining a variably weighted crash velocity value functionally related to the crash velocity value times a variable weighting factor. The method further comprises the steps of providing an actuation signal to permitting actuation of said actuatable restraining device (i) when the average acceleration value is greater than a first threshold value or (ii) when the crash velocity value is greater than a second threshold value and the variably weighted crash velocity value is greater than a third threshold value.

BRIEF DESCRIPTION OF THE DRAWINGS

Other features and advantages of the present invention will become apparent to those skilled in the art to which the present invention relates from a reading of the following detailed description with reference to the accompanying drawings, in which:

FIG. 1 is a schematic block diagram of an air bag restraint system made in accordance with the present invention;

FIGS. 2–7 are flow diagrams showing the control process of the present invention for the air bag restraint system shown in FIG. 1.

DESCRIPTION OF PREFERRED EMBODIMENTS

Figure 8:
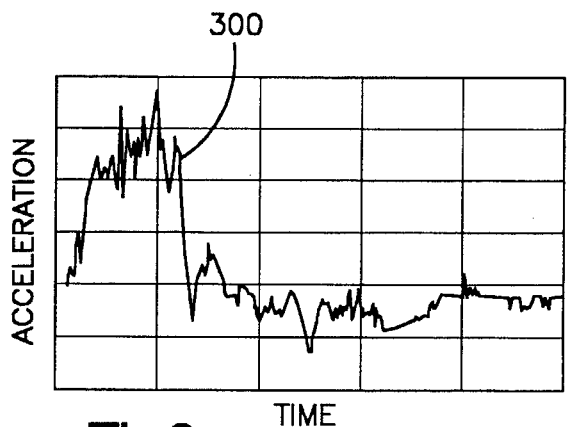
FIGS. 8–19 are graphical representations of values measured or determined by the restraint system shown in FIG. 1 for various crash conditions.

Referring to FIG. 1, an air bag restraint control circuit 30 includes an electrically actuatable squib 32 operatively connected to a gas generating composition and/or container of pressurized gas (not shown). The squib 32 is electrically connected in series with a mechanical inertia switch 34 and an electrically actuatable power Darlington transistor switch 36 (shown schematically as a single transistor) between a source of electrical energy 40 and electrical ground. When the switch 36 is actuated, electric current can flow through the transistor. The switch 36 is basically used in an ON or OFF mode.

The source of electrical energy 40 includes the vehicle battery (not shown) connected to a terminal 42. The terminal 42 is connected to switch 34 through a diode 44. The terminal 42 is also connected to the switch 34 through a series connected up-converter 46 and diode 48. The up-converter 46 converts the vehicle battery voltage to a substantially constant voltage at a predetermined value, higher than the battery voltage. The up-converter 46 is connected to and charges a capacitor 50 connected between the output of the up-converter 46 and the anode of the diode 48. This arrangement provides redundant sources of electrical energy for the squib, i.e., the vehicle battery and the charged stored energy from the capacitor 50. This redundant energy source arrangement is known in the art.

An accelerometer 60 is mounted to the vehicle and provides an electric signal having a characteristic indicative of vehicle deceleration. The accelerometer 60 is electrically connected to a controller 64 through a low-pass filter or anti-alias filter 66. Preferably, the controller 64 is a microcomputer having an internal memory and an internal analog-to-digital ("A/D") converter. The output of the low pass filter 66 is connected to an A/D converter input of the controller 64.

The controller 64 monitors the filtered acceleration signal and performs an analysis on the signal to determine if a vehicle crash is occurring. If it is determined that a vehicle crash is occurring, the controller 64 actuates the power Darlington switch 36 to turn the switch ON. When a vehicle crash occurs with sufficient intensity to close the inertia switch 34, and for which the controller actuates switch 36, a current of sufficient magnitude and duration to ignite the squib passes through the squib 32. When the squib 32 is ignited, it, in turn, ignites a gas generating composition and/or pierces a container of pressurized gas which inflates the air bag.

Referring to FIG. 2, an overview of the process, in accordance with the present invention, used to control the switch 36 is shown. The acceleration sensor 60 is connected to an internal A/D converter 70 of the controller 64 through the low-pass filter 66. The A/D converter 70 converts the acceleration signal into a digital signal. Internal to the controller 64, the converted acceleration signal is high-pass filtered by a digital filtering process 76. Digital filtering of a signal by a microcomputer is known in the art and is, therefore, not discussed herein in detail. The controller 64 calculates the crash velocity of the vehicle in step 78 based on the measured crash acceleration signal output from the accelerometer 60.

Referring now to FIG. 3, the process used in calculating or determining the vehicle crash velocity, i.e., step 78, is shown in detail. The process shown in FIG. 3 determines the crash velocity of the vehicle which is the integral of the acceleration signal during a crash event. This provides a crash velocity value of the crash event, i.e., a sudden deceleration of the vehicle. Integration of the acceleration signal in the microcomputer or controller 64 is accomplished by summing discrete values of acceleration measured over time.

Preferably, discrete measured values of the acceleration signal over time are summed together to determine the crash velocity value. To prevent inadvertent deployment as a result of accumulated past events, it is desirable to return the integrated acceleration value, i.e., the velocity value, to zero within a predetermined time after the acceleration value goes to zero. In accordance with the present invention, the controller performs a digital high-pass filtering process or return-to-zero process 84 on the determined velocity value.

In step 90 of process 84, the controller 64 determines whether the absolute value of the velocity is greater than a digital number of 128. The number 128 is representative of a predetermined decay time constant. If the determination in step 90 is affirmative, the process proceeds with step 94, where the velocity value is divided by 128 and the resulting quotient subtracted from the velocity value to establish a new velocity value. Steps 90 and 94 have the effect of decaying the velocity value back toward zero at a generally exponential rate established by the number 128.

If the determination in step 90 is negative, meaning that the velocity absolute value is equal to or less than a value represented by the number 128, the process proceeds to step 98.

Steps 98, 100, and 102 are used to force signal decay when the velocity value is close to zero. In this region of velocity values, it is computationally difficult to use the process represented by step 94. In step 98, a determination is made as to whether the velocity value is less than zero. Velocity being greater than zero is indicative of a vehicle deceleration. Velocity being less than zero is indicative of a vehicle acceleration. If the determination in step 98 is affirmative, a predetermined increment of velocity value is added to the determined velocity value in step 100 to bring the velocity value back to zero at a linear rate. If the determination in step 98 is negative, a predetermined decrement value is subtracted from the velocity value determined in step 102 to bring the velocity value back to zero, again at a linear rate.

Therefore, when the velocity absolute value is greater than 128, the velocity decay is controlled by step 94. When the velocity value is greater than or equal to zero and less than or equal to 128, the velocity decay is controlled by step 102. When the velocity value is greater than −128 and less than zero, the velocity decay is controlled by step 100.

The process then proceeds to step 108 where the controller 64 determines whether the absolute value of the determined velocity value is less than 32,000. The purpose of step 108 is to limit the determined velocity value to a maximum value to prevent overflow of the register internal to the microcomputer 64, in which the value is stored. If the absolute value of the velocity is equal to or greater than the value 32,000, the determination in step 108 is negative and the process for determining a velocity value skips to the end of the procedure, since the velocity value is already at the predetermined maximum value. If the determination in step 108 is affirmative, the process proceeds to step 110 where a next measured increment of acceleration AI is added to the present value of the velocity to establish a new velocity value. Assuming the velocity value is not at the maximum value, the summation in step 110 is the summation of all the increments of acceleration over time from the moment the module was powered up, less the decay values periodically subtracted in block 84. This summation is essentially the integral of the acceleration values. The new determined velocity value from step 110 or the maximum velocity value resulting from a negative determination in step 108 is stored in an internal memory of the controller 64 for later use. The process 78 of determining the crash velocity value is an on going process that is done on a continuous bases.

Referring back to FIG. 2, the controller next proceeds to step 120 where a "fast fire" value, referred to herein as the AWIN value, is calculated or determined. The AWIN value is essentially an average acceleration value. This average acceleration value is calculated using a sliding time window of a predetermined duration. In accordance with the preferred embodiment of the present invention, the sliding time window width is 10 msec. The process step 120, which functions to determine the average acceleration value AWIN, includes several process steps shown in FIG. 4.

Referring now to FIG. 4, the average acceleration is determined in the microcomputer by summing increments of the value of the acceleration signal over the predetermined time window. The window interval is defined by 18 consecutive measured values of acceleration using the analog-to-digital converter 70. In the preferred embodiment, acceleration sample timing is such that the 18 samples span a 10 msec. time interval. Each measured value of the acceleration is designated as AI.

The controller further determines another average acceleration value, designated AWINSUM, which is equal to the value of 18 acceleration increments AI also taken over a 10 msec. time period. AWINSUM is different than AWIN because AWIN is determined based upon a sliding time window and the AWINSUM is based upon recurring, fixed time windows. As will become apparent from the description which follows, the value AWINSUM is reset to zero at the beginning of every 10 msec. time period.

To calculate AWIN, it is necessary for the microcomputer to "remember" each of the last 18 AI values. This is accomplished by storing the AI values in an 18 location memory block. The block acts essentially as an endless loop recording tape where each new AI value overwrites the oldest value then stored in the block.

Referring more specifically to FIG. 5, the AWIN value includes 18 acceleration increments stored in memory registers (designated as blocks 0–17) with a block pointer designated AWINPTR. The block pointer AWINPTR points to the memory location where the new measured AI value is being stored and where the value of the oldest AI value was stored. After this storage process is done, AWINPTR will increment to point to the next successive memory register. This occurs in step 140, described below.

Returning to the flow chart of FIG. 4, in step 130, the controller calculates a new value for AWIN by adding the most recent measured acceleration increment AI to the current value of AWIN (which will have a value equal to the sum of the previous 18 incremental measurements of AI), while subtracting from the resulting sum an acceleration increment added 18 measurements earlier. The result is an updated AWIN which is equal to the sum of the last 18 values of AI. This summed value in functionally related to the average acceleration and is equal to the average acceleration times 18.

Those skilled in the art will appreciate that the value of AWIN is a running sum of the last 18 AI values and requires continuous redundant summing processes. Rather than adding the values in the 18 memory registers each time AWIN is determined, only the new incremental AI value is added and the AI value 18 measurements earlier subtracted. Therefore only two arithmetic operations are needed for each new determination of AWIN.

To verify the integrity of the on-going running sum calculation, the present invention periodically "checks" AWIN against an independently calculated value referred to as AWINSUM.

Referring back to FIG. 4, the process proceeds from calculating AWIN in step 130 to calculating AWINSUM in step 140. In this step, the same acceleration incremental value AI that is being summed to determine the AWIN value is also used to determine the AWINSUM value. In step 140, the latest AI value is added to AWINSUM to generate an updated AWINSUM value, and AWINPTR is then incremented. Instead of subtracting an old AI value at the same time, however, the AWINSUM values are instead allowed to accumulate over an 18 sample interval (i.e., over 18 repetitions of the process shown in FIG. 2). At the end of that 18 sample (10 msec.) interval, AWINSUM will have a value equal to the sum of the last 18 values of AI.

The end of the 18 sample interval is detected in step 150. Specifically, in step 150, a determination is made as to whether the position of the pointer AWINPTR is equal to 17. This is, in effect, a determination as to whether the then-current value of AWINSUM is the sum of 18 consecutively preceding AI values. If the determination in step 150 is affirmative, the process proceeds to step 156 where the value of the AWINPTR is reset to zero, the value of AWIN is set equal to the current value of AWINSUM, and the value of AWINSUM is then reset to zero.

The purpose of setting AWIN equal to AWINSUM in step 156 is to eliminate from the AWIN summation the effect of any mistakes that may have crept into the running sum process. Such mistakes could be due, for example, to radiated or conducted EMI/RFI noise. The effect of such an EMI alteration would remain in the AWIN calculation unless some correction process were used. In the present embodiment, such an error is eliminated each time AWIN is set equal to AWINSUM. If the AWINSUM register is affected, i.e., it also has a value error due to EMI, the error will be eliminated when the affected register is reset to zero after the AWINPTR equals 17.

Those skilled in the art will appreciate that if no error is introduced in the AWIN registers, the value of AWIN will equal the value for AWINSUM each time the AWINPTR is equal to 17 because, at that time, both will equal the sum of the last 18 AI values. Thus, setting AWIN equal to AWINSUM should produce no change in the value of AWIN. If the determination in step 150 is negative, then step 156 is skipped.

The process then proceeds to step 160 where a slow fire value, referred to herein as JMM2, is calculated. JMM2 is a value indicative of how the crash event is developing in velocity and displacement as a function of time. The value of JMM2 is functionally related to the total energy of the crash and is, more specifically, proportional to the crash velocity times a variable weighting factor. The variable weighting factor is functionally related to crash energy and varies as a function of both velocity and time. This slow fire value is calculated in a process which includes a plurality of steps shown in FIG. 6.

Referring to FIG. 6, in step 170, a crash distance value is determined by integrating the crash velocity over time. The velocity value is determined in accordance with the process shown in FIG. 3 and shown as step 78 of FIG. 2. As discussed above, integration is accomplished in a microcomputer by doing a plurality of summations of discrete values over time, i.e., a summation of time-slice values. In step 170, the crash distance ("DIST") is determined by summing incremental crash velocity values V over time, i.e., by integrating crash velocity.

$$DIST = \int V dt \qquad (1)$$

The value determined in step 170 is a value functionally related to "distance" as determined from the signal from the accelerometer. The "distance" may be thought of as the distance an unrestrained object within the vehicle would have moved relative to the vehicle due to vehicle deceleration. The number 256 used in this determination (i.e., velocity value V divided by 256 added to the then determined distance value DIST) is included for scaling purposes and is referred to as a scaling factor. The value 256 is used to ensure that the microcomputer arithmetic registers do not overflow. The process then proceeds to step 172. Step 172 decays the distance value DIST back toward zero at a rate determined by the decay time constant value of 256.

The process then proceeds to step 176 where a determination is made as to whether both the determined crash velocity value V and the crash distance value DIST are greater than zero. This determination is, in effect, a test of whether the vehicle is accelerating in a rearward direction. When the vehicle is rapidly decelerating, as during a frontal crash, acceleration is in a rearward direction. The determination in step 176 will be negative if the vehicle is not accelerating in a rearward direction and will be affirmative if the vehicle is accelerating in a rearward direction. If the determination in step 176 is negative, the process sets the value JMM2 equal to zero in step 180.

If the determination in step 176 is affirmative, the process proceeds to step 186 where a value, referred to as AREA, is determined. This AREA value is functionally related to the total energy of the crash. The energy value AREA is an integration of the crash velocity value squared and is calculated by summing incremental values of the crash velocity squared. The incremental calculation accomplished in step 186 is the summation of the present $V^2$ value divided by a scaling factor of 256 and the previous AREA. The resulting sum is a new, or updated AREA value. If the energy term $V^2$ were plotted on a time graph starting at the onset of the crash event, the value determined in step 186 would be functionally related to the area under the curve or, in other words, to the integral of $V^2$.

$$AREA = \int V^2 dt \qquad (2)$$

After the determination in step 186, the controller performs, in block 190, a high pass filtering of the determined energy value or a return-to-zero function on the determined energy value. To perform this filtering or return-to-zero function, the controller 64 makes a determination in step 196 as to whether the AREA is greater than 256. If the determination in step 196 is negative, the process proceeds to step 198 where the value of the AREA is set equal to 256. Thus, the blocks 196 and 198 cooperate to establish a minimum value of 256 for the AREA variable. This minimum value is established to insure that the quotient produced in step 200 (below) will never be less than one.

If the determination in step 196 is affirmative, i.e., the AREA value is greater than 256, the process proceeds to step 200 where a value equal to the AREA divided by 128 is subtracted from the AREA to establish a new value for the AREA. The value 128 controls the time constant of the generally exponential decay. The process proceeds from either step 198 or step 200 to step 210 where a variably weighted velocity value JMM2 is determined.

The variably weighted velocity value JMM2 is calculated by multiplying the velocity V (determined in step 78) times a variable weighting factor. The variable weighting factor is equal to the distance DIST (determined in steps 170, 172) times a scaling factor 256, divided by the AREA (determined in step 186). Thus, the variable weighting factor is directly related to the crash distance and inversely related to the crash energy.

$$JMM2 = V \times \left[ \frac{(DIST \times 256)}{AREA} \right] \qquad (3)$$

The JMM2 value indicates the manner in which the crash event develops in velocity and displacement as a function of time. At the onset of a crash, the crash velocity is low. As displacement grows and stiffer structural members of the vehicle are encountered, however, crash velocity increases rapidly. During a more slowly developing crash, e.g., a lower speed pole crash, the crash velocity and displacement values grow slowly during the initial portion of the crash event and then grow more quickly during the later portion which increases the JMM2 value.

The JMM2 equation above can be considered in either terms of time or crash distance. In time, the crash distance DIST is equation (1) above $$DIST = \int V dt \quad (1)$$

and crash area is equation (2) above $$AREA = \int V^2 d \quad (2)$$

so that $$JMM2 = V \times \left[ \frac{256 \int V dt}{\int V^2 dt} \right] \quad (4)$$

To express JMM2 in terms of crash distance, we again start with equation (1) above $$DIST = \int V dt \quad (1)$$

By differentiating both sides of the DIST equation (1), we get $$d(DIST) = V dt \quad (5)$$

Multiplying both sides of equation (5) by V we get $$V d(DIST) = V^2 dt \quad (6)$$

By integrating both sides of equation (6) we get $$\int V d(DIST) = \int V^2 dt \quad (7)$$

By substituting equations (1) and (7) into equation (4), we get $$JMM2 = V \times \frac{256 \times (DIST)}{\int V d(DIST)} \quad (8)$$

Moving the (DIST) term in equation (8) to the denominator, we get $$JMM2 = \frac{256 V}{\frac{\int V d(DIST)}{(DIST)}} \quad (9)$$

Equation number (9) is an expression of JMM2 in terms of a change in crash velocity to a crash distance. The change in crash velocity is considered over the entire crash event.

From either step 210 or step 180, the process proceeds to step 220 where a determination is made as to whether the velocity value V is equal to zero. The inquiry in step 220 functions as a JMM2 system reset. If the crash velocity value V is equal to zero, indicating that the crash condition has ended, then the process proceeds to step 228. In step 228 the distance value DIST is set equal to zero and the AREA value is set to 256 (the AREA's smallest permitted value). Setting a minimum AREA value equal to 256 prevents an arithmetic overflow condition. From either step 228 or from a negative determination in step 220, i.e., the crash event is continuing, the process proceeds to step 240 shown in FIG. 2.

Step 240 is generally referred to as the "Fire-Rule" and is the control process followed by the controller 64 to control actuation of the transistor switch 36. The "Fire-Rule" includes the plural of steps shown in FIG. 7. Referring to FIG. 7, a determination is made in step 260 as to whether the acceleration average value AWIN is greater than a predetermined threshold value WTHRESH. If the crash event is a rapidly occurring event, i.e., one with an initial high energy value resulting in a large vehicle deceleration, the determination in step 260 would be affirmative. When the determination in step 260 is affirmative, the controller 64 jumps to step 270 and proceeds to then actuate the switch 36. If or when the inertia switch 34 is closed and switch 36 is actuated in step 270, an electric current will pass through the squib so as to ignite the squib and thereby initiate deployment of the air bag.

If the determination in step 260 is negative, the process proceeds to step 276 where a determination is made as to whether the velocity value V (determined in step 110) is greater than a predetermined velocity threshold value VTHRESH. The determination in step 276 functions as a gating step that must be determined affirmatively before step 280 is processed. If the velocity value V is not greater than the threshold value VTHRESH, the determination in step 276 will be negative and the controller will skip to step 284 and thus not actuate the switch 36 (indicated by step 284).

If the determination in step 276 is affirmative, the process proceeds to step 280 where a determination is made as to whether the variably weighted velocity value JMM2 is greater than a predetermined threshold value JTHRESH. If the determination in step 280 is affirmative, the controller 64 actuates the switch 36 to an ON condition. If or when the inertia switch 34 is closed and switch 36 is actuated in step 270, an electric current will pass through the squib so as to ignite the squib and deploy the air bag.

Those skilled in the art will appreciate that the control process shown in FIGS. 2–7 is a continuous, on-going process which is repeated each time a new AI value becomes available from the analog-to-digital converter. After the NO-FIRE step 284, the entire process is repeated. In each AI cycle, AWIN and JMM2 values are determined, and FIRE or NO-FIRE decisions made.

Referring to FIGS. 8–11, values of various signals produced during a particular crash event are depicted. The crash event depicted is a 7 mph crash into a barrier, which is categorized as a non-deployment event. A "nondeployment" crash event is one in which the seat belts alone are sufficient to protect the vehicle occupants. A "deployment" crash event is one in which it is desirable to deploy an air bag restraint to enhance, in combination with occupant seat belts, the occupant restraining function.

Figure 9:
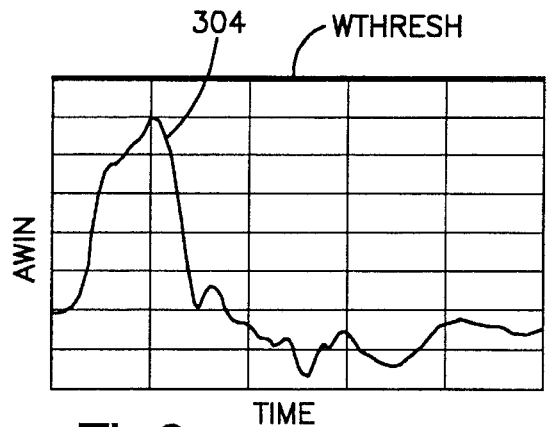
Figure 10:
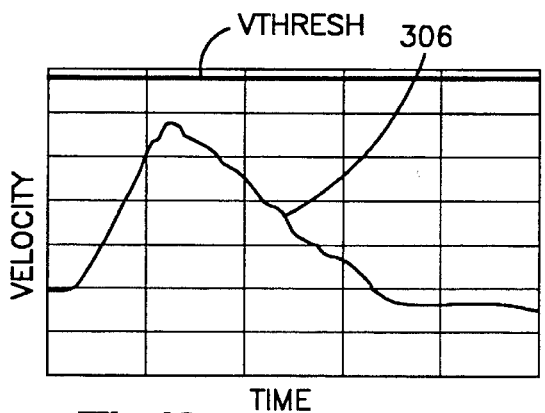
Figure 11:
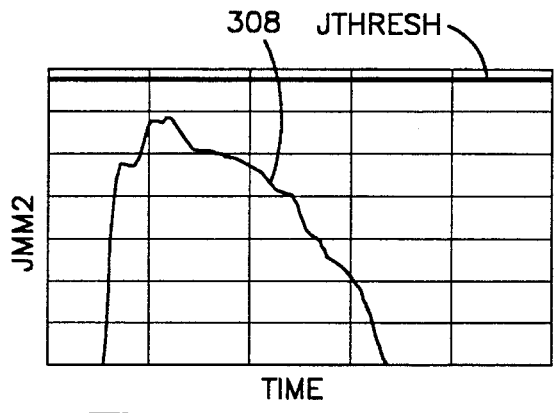

Specifically, FIG. 8 depicts an acceleration signal 300 as it is output from the low pass filter 66 and input to the A/D channel of the controller 64 for a 7 MPH crash into a barrier. FIG. 9 depicts the value 304 of the average acceleration AWIN as a function of time as determined from the acceleration signal of FIG. 8 and determined in steps 120–156. At no time during the crash event is AWIN greater than the threshold value WTHRESH. Therefore, the determination at each pass through step 260 is negative. FIG. 10 depicts the crash velocity value 306, as determined in steps 78–110. At no time during the crash event is the velocity greater than the threshold value VTHRESH. Therefore, the determination at each pass through step 276 will similarly be negative. Although the process in this example does not perform step 280, the JMM2 value 308 is determined from the acceleration value of FIG. 8 and is shown in FIG. 11. At no time during the crash event is the JMM2 value greater than threshold value JTHRESH. From the graphs of FIGS. 8–11, it can be seen that the air bag would not be deployed under this type of crash event even if the inertia switch is closed.

Figure 12:
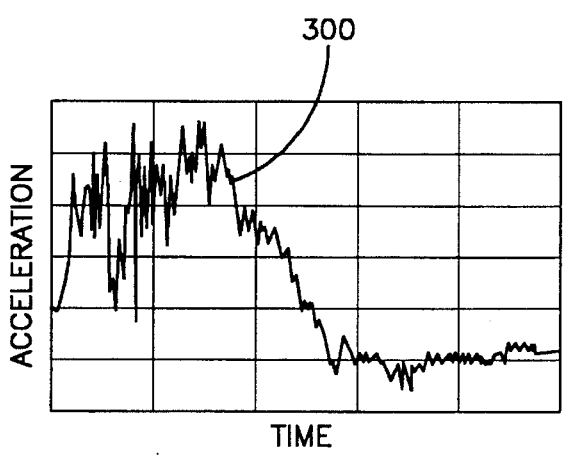
Figure 13:
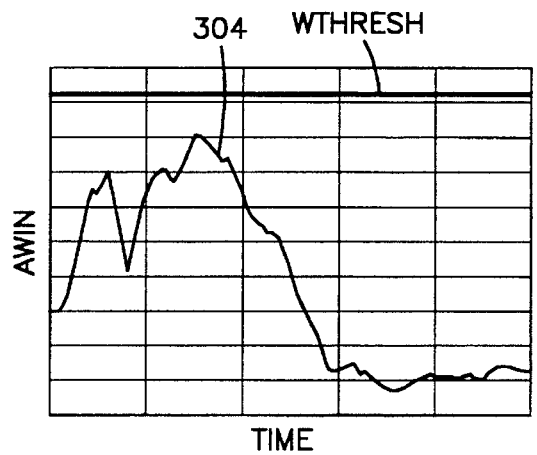

Referring to FIGS. 12–15, values of various signals arising from a different crash event are depicted. The crash event depicted is a low-energy, deployment crash event and, specifically, a 16 MPH oblique crash into a barrier. FIG. 12 depicts the acceleration signal 300 as it is output from the low pass filter 66 and input to the A/D channel of the controller 64. FIG. 13 depicts the value 304 of the average acceleration AWIN as a function of time as determined from the acceleration signal of FIG. 12 and determined in steps 120–156. At no time during the crash event is AWIN greater than the threshold value WTHRESH. Therefore, each determination in step 260 is negative.

Figure 14:
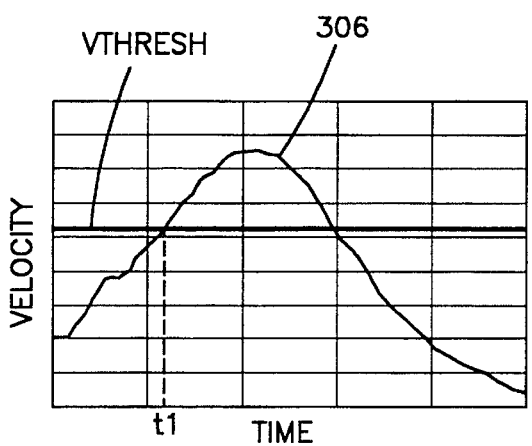
Figure 15:
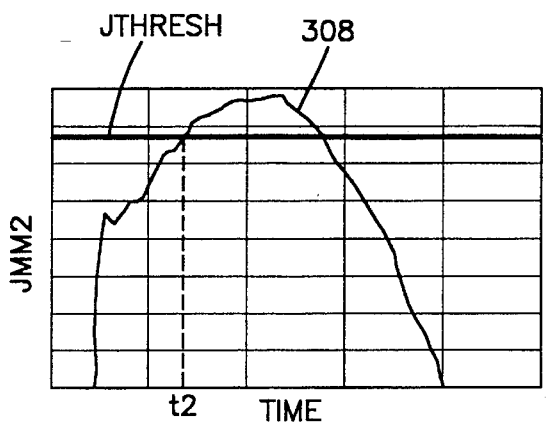

FIG. 14 depicts the determined crash velocity value 306 determined in steps 78–110. At time t1 into the crash event, the crash velocity V becomes greater than the threshold value VTHRESH. Therefore, the determination in step 276 will be affirmative. After time t1, the inquiry of step 280 is performed. (The time scales for graphs 12–15 are the same.) The JMM2 value 308 is derived from the acceleration value of FIG. 12 and is shown in FIG. 15. At time t2 into the crash event, the JMM2 value is greater than the threshold value JTHRESH. At time t2, switch 36 is actuated to an ON condition.

From the graphs of FIGS. 12–15, it can be seen that the air bag would deploy if the inertia switch were closed or closes at or after time t2. The values of the velocity V and JMM2 eventually fall back below their associated threshold values VTHRESH and JTHRESH, respectively due to their decay routines 84, 190. When the value of V and/or JMM2 fall back below their associated threshold values, the switch 36 would be opened by the controller 64 after a predetermined time period, e.g., 50 msec. in the preferred embodiment.

Figure 16:
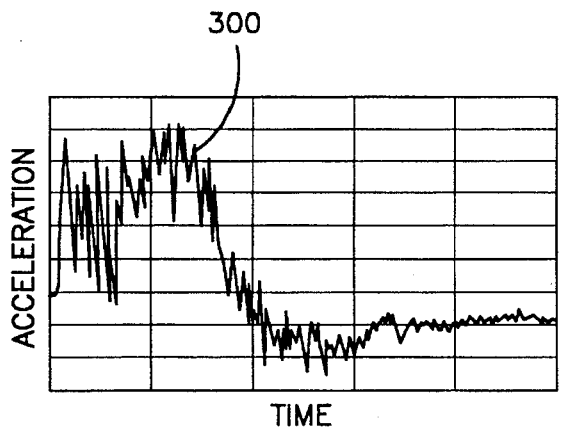
Figure 17:
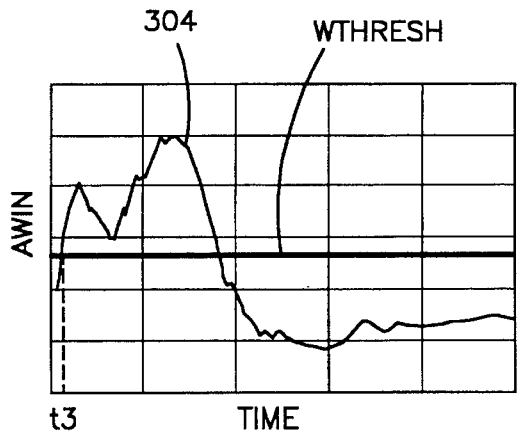

Referring to FIGS. 16–19, values of various signals arising from yet another crash event are depicted. The crash event depicted is a high-energy, deployment crash event such as a 30 MPH crash into a barrier. Specifically, FIG. 16 depicts an acceleration signal 300 as it is output from the low pass filter 66 and input to the A/D channel of the controller 64. FIG. 17 depicts the value 304 of the average acceleration AWIN as a function of time as determined from the acceleration signal of FIG. 16 and determined in steps 120–156. At time t3 during the crash event, AWIN becomes greater than the threshold value WTHRESH. (The time scale for FIGS. 16–19 are the same.) At this time t3, the determination in step 260 becomes positive and the switch 36 is actuated to an ON condition. Any closure of the inertia switch 34 at or after time t3 will therefore result in deployment of the air bag.

Figure 18:
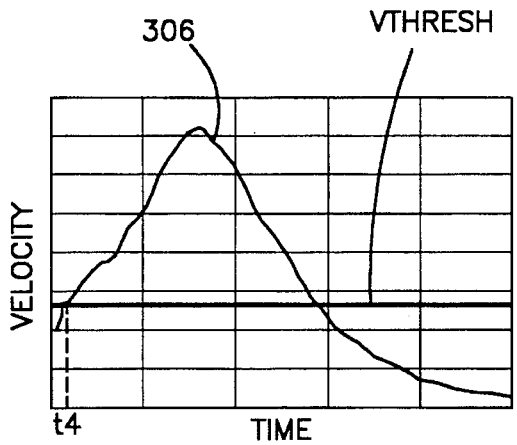
Figure 19:
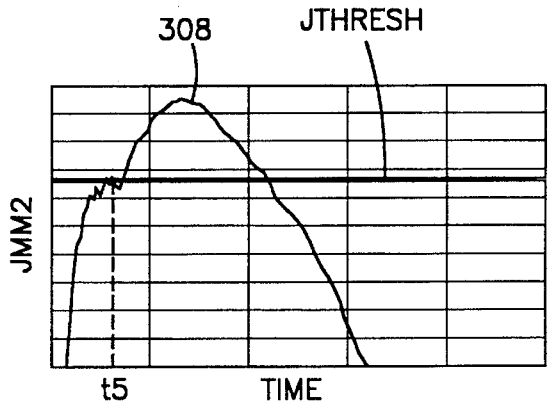

Even though the values of crash velocity and JMM2 are not needed after time t3, their values are of interest and helpful to understanding of the present invention. Assume for discussion that 276 and 280 are still being performed. FIG. 18 depicts the determined crash velocity value 306 determined in steps 78–110. At time t4 into the crash event, the crash velocity V becomes greater than the threshold value VTHRESH. Therefore, the determination in step 276 will be affirmative. After time t4, the inquiry of step 280 would be performed. The JMM2 value 308 is determined from the acceleration value of FIG. 16 and is shown in FIG. 19. At time t5 into the crash event, the JMM2 value is greater than the threshold value JTHRESH. From the graphs of FIGS. 16–19, it can be seen that the air bag will be deployed under this type of crash event if the inertia switch is closed or closes on or after time t3. The values of the crash velocity V, and the variably weighted velocity value JMM2 eventually fall back below their associated threshold values VTHRESH and JTHRESH, respectively due to decay routines 84 and 190. When AWIN and V and/or JMM2 fall back below their associated threshold values, the switch 36 is deactuated by the controller 64 after a predetermined time period, e.g., 50 msec. in accordance with a preferred embodiment.

This invention has been described with reference to preferred embodiments. Modifications and alterations may occur to others upon reading and understanding this specification. For example, the invention has been described with a series connected inertia switch, squib, and electrically controlled switch. It is contemplated that the inertia switch could be eliminated with the firing circuit including a series connected squib and electrically controlled switch. In this arrangement, actuation of the electrically controlled switch by the controller 64 would directly actuate the air bag restraint system. It is intended to include all such modifications and alterations insofar as they come within the scope of the appended claims and the equivalents thereof.

Having fully described the invention, the following is claimed:

1. An apparatus for controlling an actuatable restraining device of a vehicle, said apparatus comprising:

means for providing an electrical deceleration signal having a characteristic indicative of deceleration of the vehicle;

determining means for determining from said deceleration signal a value indicative of a change in vehicle crash velocity to crash distance; and control means for actuating the actuatable restraining means when said determined value exceeds a predetermined threshold value.

2. An apparatus for controlling an actuatable restraining device of a vehicle, said apparatus comprising:

means for providing an electrical acceleration signal having a characteristic indicative of crash acceleration of the vehicle;

average acceleration determining means for monitoring said acceleration signal at a plurality of discrete times and for determining an average acceleration value in response to said monitored acceleration signal, wherein said average acceleration determining means includes first average acceleration determining means for determining a first average acceleration value from said acceleration signal over a predetermined time period, second average acceleration determining means for determining a second average acceleration value from said acceleration signal over said predetermined time period, and means to set said first average acceleration value equal to said second average acceleration value at the end of said predetermined time period; and means for actuating the actuatable restraining device when said first average acceleration value exceeds a predetermined threshold value.

3. The apparatus of claim 1 wherein said average acceleration determining means further includes means to reset said second average acceleration value equal to zero at the end of each said predetermined time period.

4. The apparatus of claim 1 wherein said first average acceleration value is determined within a sliding time window.

5. An apparatus for controlling an actuatable restraining device of a vehicle, said apparatus comprising:

means for providing an electrical deceleration signal having a characteristic indicative of deceleration of the vehicle;

average acceleration determining means for determining a first value functionally related to an average acceleration value in response to said electrical deceleration signal;

velocity value determining means for determining a second value functionally related to vehicle crash velocity;

variably weighted velocity value determining means for determining a third value functionally related to a crash velocity value times a variable weighting factor; and actuation control means for providing an actuation signal to actuate said actuatable restraining device (i) when said first value is greater than a first threshold value or (ii) when said second value is greater than a second threshold value and said third value is greater than a third threshold value.

6. An apparatus for controlling an actuatable restraining device of a vehicle, said apparatus comprising:

a series connected circuit including an inertia switch, a squib, and an electrically controlled switch connected across a source of electrical energy, said inertia switch closing upon occurrence of a vehicle crash event;

means for providing an electrical deceleration signal having a characteristic indicative of crash deceleration of the vehicle;

determining means for determining a variably weighted crash velocity value from said crash deceleration signal, and control means for actuating said electrically controlled switch closed when said determined variably weighted crash velocity value is greater than a first threshold value, simultaneous closure of said inertia switch and said electrically controlled switch actuating said squib which results in actuation of said restraining device.

7. The apparatus of claim 6 wherein said determining means includes means to determine a crash velocity value from said deceleration signal and multiplying said crash velocity value times a variable weighting factor to establish said variably weighted velocity value.

8. The apparatus of claim 7 wherein said variable weighting factor varies as a function of crash distance.

9. The apparatus of claim 7 wherein said variable weighting factor varies inversely as a function of crash energy.

10. The apparatus of claim 7 wherein said variable weighting factor varies as a function of crash distance and inversely as a function of crash energy.

11. The apparatus of claim 7 wherein said variable weighting factor is proportional to $$\frac{DIST}{\int V^2 dt}$$

where DIST is crash distance and V is crash velocity.

12. The apparatus of claim 11 wherein DIST is proportional to $$\int V dt.$$

13. The apparatus of claim 6 further including average acceleration determining means for determining an average acceleration value from said deceleration signal and wherein said control means actuates the actuatable restraining means when said determined average acceleration value exceeds a second threshold value.

14. The apparatus of claim 13 wherein said average acceleration determining means includes first average acceleration determining means for determining a first average acceleration value from said deceleration signal over a predetermined time period, second average acceleration determining means for determining a second average acceleration value from said deceleration signal over said predetermined time period, and means to set said firsts average acceleration value equal to said second average acceleration value at the end of said predetermined time period, said control means being responsive to said first average acceleration signal.

15. The apparatus of claim 14 wherein said average acceleration determining means further includes means to reset said second average acceleration value equal to zero at the end of each said predetermined time period.

16. The apparatus of claim 14 wherein said first average acceleration value is determined within a sliding time window.

17. The apparatus of claim 6 wherein said control means includes means for determining if said variably weighted crash velocity value is greater than said first threshold value only if crash velocity is greater than a predetermined velocity threshold value.

18. An apparatus for controlling an actuatable restraining device of a vehicle, said apparatus comprising:

a series connected circuit including an inertia switch, a squib, and an electrically controlled switch connected across a source of electrical energy, said inertia switch closing upon occurrence of a vehicle crash event;

means for providing an electrical deceleration signal having a characteristic indicative of deceleration of the vehicle;

determining means for determining from said deceleration signal a value indicative of a change in vehicle crash velocity to crash distance; and control means for actuating said electrically controlled switch closed when said determined value exceeds a predetermined threshold value, simultaneous closure of said inertia switch and said electrically controlled switch actuating said squib which results in actuation of said restraining device.

19. An apparatus for controlling an actuatable restraining device of a vehicle, said apparatus comprising:

a series connected circuit including an inertia switch, a squib, and an electrically controlled switch connected across a source of electrical energy, said inertia switch closing upon occurrence of a vehicle crash event;

means for providing an electrical deceleration signal having a characteristic indicative of deceleration of the vehicle;

average acceleration determining means for monitoring said deceleration signal at a plurality of discrete times and for determining an average deceleration value in response to said monitored deceleration signal; and means for actuating said electrically controlled switch closed when said determining average deceleration value exceeds a predetermined threshold value, simultaneous closure of said inertia switch and said electrically controlled switch actuating said squib which results in actuation of said restraining device.

20. The apparatus of claim 19 wherein said average acceleration determining means includes first average acceleration determining means for determining a first average acceleration value from said deceleration signal over a predetermined time period, second average acceleration determining means for determining a second average acceleration value from said deceleration signal over said predetermined time period, and means to set said first average acceleration value equal to said second average acceleration value at the end of said predetermined time period, said control means being responsive to said first average acceleration signal.

21. The apparatus of claim 20 wherein said average acceleration determining means further includes means to reset said second average acceleration value equal to zero at the end of each said predetermined time period.

22. The apparatus of claim 20 wherein said first average acceleration value is determined within a sliding time window.

23. An apparatus for controlling an actuatable restraining device of a vehicle, said apparatus comprising:

a series connected circuit including an inertia switch, a squib, and an electrically controlled switch connected across a source of electrical energy, said inertia switch closing upon occurrence of a vehicle crash event;

means for providing an electrical deceleration signal having a characteristic indicative of deceleration of the vehicle;

average acceleration determining means for determining a first value functionally related to an average acceleration value in response to said electrical deceleration signal;

velocity value determining means for determining a second value functionally related to vehicle crash velocity;

variably weighted velocity value determining means for determining a third value functionally related to a crash velocity value times a variable weighting factor; and actuation control means for providing an actuation signal to actuate said electrically controlled switch closed (i) when said first value is greater than a first threshold value or (ii) when said second value is greater than a second threshold value and said third value is greater than a third threshold value, simultaneous closure of said inertia switch and said electrically controlled switch actuating said squib which results in actuation of said restraining device.

24. A method for controlling an actuatable restraining device, comprising the steps of:

determining crash deceleration of the vehicle;

determining a variable weighted crash velocity value in response to said determined crash deceleration so that said variable weighted crash velocity value varies inversely as a function of crash energy; and actuating said actuatable restraining device when said determined variable weighted crash velocity value exceeds a predetermined threshold value.

25. A method for controlling an actuatable restraining device, comprising the step of:

determining crash deceleration of the vehicle;

determining a change in crash velocity to crash distance in response to said determined crash deceleration; and actuating said actuatable restraining device when said determined change in crash velocity to crash distance exceeds a predetermined threshold value.

26. A method for controlling an actuatable restraining device, comprising the steps of:

providing an electrical signal having a characteristic indicative of vehicle crash acceleration;

monitoring said acceleration signal at a plurality of discrete times during a crash event;

determining an average crash acceleration value from said monitorings of said signal, wherein said determining step includes determining a first average acceleration value from said acceleration signal over a predetermined time period, determining a second average acceleration value from said acceleration signal over said predetermined time period, and setting said first average acceleration value equal to said second average acceleration value at the end of said predetermined time period; and actuating said actuatable restraining device when said determined first average crash deceleration value exceeds a predetermined threshold value.

27. A method for controlling an actuatable restraining device comprising the steps of:

determining vehicle deceleration;

determining an average deceleration value in response to said determined deceleration;

determining a crash velocity value in response to the determined vehicle deceleration;

determining a variably weighted velocity value functionally related to the crash velocity value times a variable weighting factor; and actuating said actuatable restraining device (i) when said determined average deceleration value is greater than a first threshold value or (ii) when said crash velocity value is greater than a second threshold value and when the variably weighted crash velocity value is greater than a third threshold value.

28. The method of claim 27 wherein said step of determining an average deceleration value includes the steps of determining a first average deceleration value from said determined deceleration value over a predetermined time period, determining a second average deceleration value from said deceleration signal over said predetermined time period, and setting said first average deceleration value equal to said second average deceleration value at the end of said predetermined time period.

29. The method of claim 28 further including the step of resetting said second average deceleration value to zero at the beginning of each said predetermined time period.

30. The method of claim 27 wherein said step of determining a first average deceleration value occurs over a sliding time window.

31. The method of claim 27 wherein said step of determining a variable weighted velocity value includes determining said variably weighting factor according to $$\frac{DIST}{\int V^2 dt}$$

where DIST is crash distance and V is crash velocity.

32. The method of claim 27 wherein said step of actuating said actuatable restraining device includes the step of determining if a crash velocity value is greater than a velocity threshold value and preventing actuation based on said variable weighted velocity value unless said velocity value is greater than said velocity threshold value.

33. An apparatus for controlling an actuatable restraining device of a vehicle, said apparatus comprising:

means for providing an electrical deceleration signal having a characteristic indicative of crash deceleration of the vehicle;

determining means for determining a variably weighted crash velocity value from said crash deceleration signal;

control means for actuating the actuatable restraining means when said determined variably weighted crash velocity value is greater than a first threshold value; and average acceleration determining means for determining an average acceleration value from said deceleration signal and wherein said control means actuates the actuatable restraining means when said determined average acceleration value exceeds a second threshold value.

34. The apparatus of claim 33 wherein said average acceleration determining means includes first average acceleration determining means for determining a first average acceleration value from said deceleration signal over a predetermined time period, second average acceleration determining means for determining a second average acceleration value from said deceleration signal over said predetermined time period, and means to set said first average acceleration value equal to said second average acceleration value at the end of said predetermined time period, said control means being responsive to said first average acceleration signal.

35. The apparatus of claim 34 wherein said average acceleration determining means further includes means to reset said second average acceleration value equal to zero at the end of each said predetermined time period.

36. The apparatus of claim 34 wherein said first average acceleration value is determined within a sliding time window.

37. An apparatus for controlling an actuatable restraining device of a vehicle, said apparatus comprising:

means for providing an electrical deceleration signal having a characteristic indicative of crash deceleration of the vehicle;

determining means for determining a variably weighted crash velocity value from said crash deceleration signal, including means for determining a crash velocity value from said deceleration signal and multiplying said crash velocity value times a variable weighting factor to establish said variably weighted velocity value, said variable weighting factor varying inversely as a function of crash energy; and control means for actuating the actuatable restraining means when said determined variably weighted crash velocity value is greater than a first threshold value.

38. An apparatus for controlling an actuatable restraining device of a vehicle, said apparatus comprising:

means for providing an electrical deceleration signal having a characteristic indicative of crash deceleration of the vehicle;

determining means for determining a variably weighted crash velocity value from said crash deceleration signal, including means for determining a crash velocity value from said deceleration signal and multiplying said crash velocity value times a variable weighting factor to establish said variably weighted velocity value, said variable weighting factor varying as a function of crash distance and inversely as a function of crash energy; and control means for actuating the actuatable restraining means when said determined variably weighted crash velocity value is greater than a first threshold value.

39. An apparatus for controlling an actuatable restraining device of a vehicle, said apparatus comprising:

means for providing an electrical deceleration signal having a characteristic indicative of crash deceleration of the vehicle;

determining means for determining a variably weighted crash velocity value from said crash deceleration signal, including means for determining a crash velocity value from said deceleration signal and multiplying said crash velocity value times a variable weighting factor to establish said variably weighted velocity value, said variable weighting factor being proportional to $$\frac{DIST}{\int V^2 dt}$$

where DIST is crash distance and V is crash velocity; and control means for actuating the actuatable restraining means when said determined variably weighted crash velocity value is greater than a first threshold value.

40. The apparatus of claim 39 wherein DIST is proportional to $$\int V dt.$$

41. An apparatus for controlling an actuatable restraining device of a vehicle, said apparatus comprising:

means for providing an electrical deceleration signal having a characteristic indicative of crash deceleration of the vehicle;

determining means for determining a variably weighted crash velocity value from said crash deceleration signal; and control means for actuating the actuatable restraining means when said determined variably weighted crash velocity value is greater than a first threshold value, said control means including means for determining if said variably weighted crash velocity value is greater than said first threshold value only if crash velocity is greater than a predetermined velocity threshold value.

42. The method of claim 27 wherein said step of determining vehicle deceleration includes the step of providing an electrical signal having a characteristic indicative of vehicle crash deceleration, and wherein said step of determining an average deceleration value includes the steps of monitoring said signal at a plurality of discrete times during a crash event and determining the average crash deceleration value from said monitorings of said signal.

* * * * *

UNITED STATES PATENT AND TRADEMARK OFFICE
CERTIFICATE OF CORRECTION

PATENT NO. : 5,498,028
DATED : March 12, 1996
INVENTOR(S) : Mark Carlin, James G. McCuskey and Koichi Sugiyama It is certified that error appears in the above-indentified patent and that said Letters Patent is hereby corrected as shown below:

Column 12, line 56, change "1" to --2--.

Column 12, line 60, change "1" to --2--.

Column 14, line 4, change "firsts" to --first--.

Signed and Sealed this

Thirteenth Day of August, 1996

*Attest:*

BRUCE LEHMAN

*Attesting Officer*     *Commissioner of Patents and Trademarks*